Oct. 3, 1967  E. R. COFFEY  3,344,615
CONDUIT BURYING ATTACHMENT
Filed April 9, 1965  2 Sheets-Sheet 1
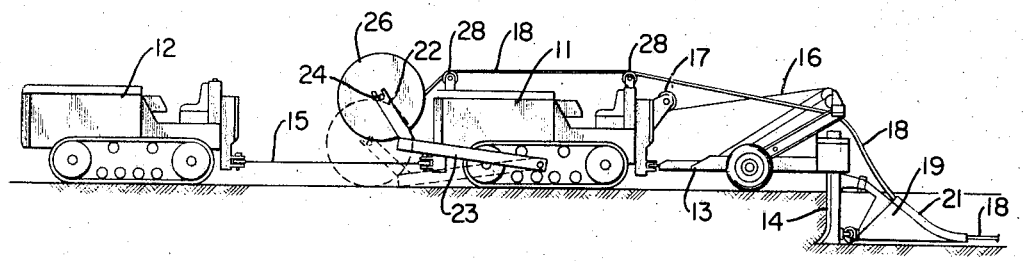
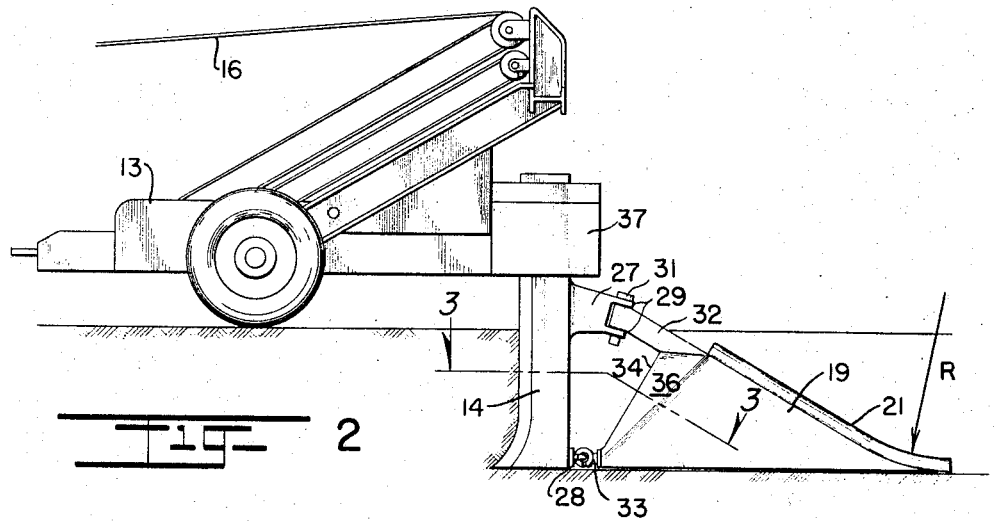
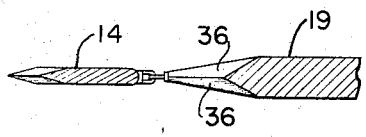
INVENTOR.
EUGENE R. COFFEY
BY
ATTORNEY

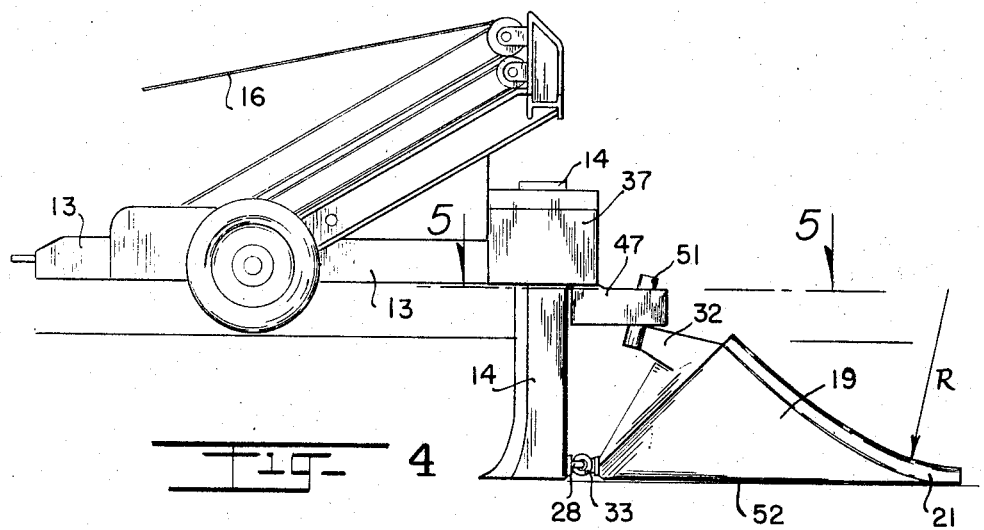
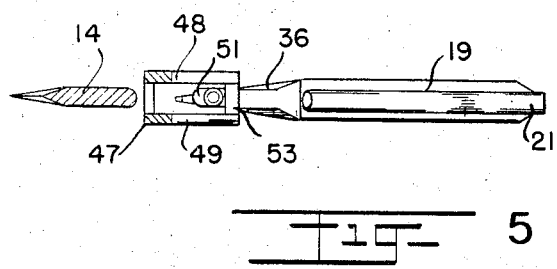

United States Patent Office 3,344,615
Patented Oct. 3, 1967

3,344,615
CONDUIT BURYING ATTACHMENT
Eugene R. Coffey, Littleton, Colo.
(107 Duncan Place, Montrose, Colo. 81401)
Filed Apr. 9, 1965, Ser. No. 446,815
9 Claims. (Cl. 61—72.6)

ABSTRACT OF THE DISCLOSURE

A tractor-towed mole type device to be moved through the ground behind a ripper tooth which incorporates an improved hitch for more efficiently injecting flexible conduit beneath ground surfaces of irregular contour, in which the hitch mechanisms provide an inclined pivot for said mole, and with embodiments permitting fore and aft movement of upper pivot elements.

The present invention relates to means for burying long lengths of flexible conduit. The invention further relates to a system for carrying and emplacing flexible conduits, such as pipe and cable, through use of implements and attachments for conventional construction equipment.

It is recognized that others have been concerned with the emplacement of conduits in positions beneath the ground so that such conduits can be protected from the effects of wind, weather, seasonal freezing, abrasion and other damaging influences. In satisfaction of such requirements, it has generally been necessary to dig a trench so that the conduit elements may be placed therein. Though the cost of digging trenches has been materially reduced over recent years, it is still desirable to provide means for placing buried conduit at a faster and more economical rate.

In satisfaction of such desire, the present invention provides means for directly implanting various types of conduit, inclusive of water and gas pipes, communication cables, oil lines and the like.

A further object of the invention is to provide means for simultaneously ripping a path through soil and ground surfaces and emplacing flexible conduit directly into position at the bottom of such ripped path.

A further object of the invention is to provide an attachment that may be used together with conventional bulldozer and ripper implements to implant flexible conduits in the path gouged by a ripper tooth.

Another object of the invention is to provide means for hoisting, carrying and dispensing flexible conduit from a reel storage drum so that such conduit will be emplaced progressively along an underground path.

A further and important object of the invention is to provide a conduit emplacing attachment for construction equipment that will follow a prescribed path behind a ripper element in a manner that avoids breakage or damage to flexible conduit members being emplaced by such conduit attachment.

Further objects and advantages of the present invention will be apparent from the appended description and drawings, in which:

FIG. 1 is a side elevation in partial section illustrating the overall arrangement of equipment in connection with the practice of the invention, FIG. 2 is an enlarged elevation in partial cross-section more closely presenting details of the ripper tooth and implant or mole attachment, FIG. 3 is a partial cross-sectional elevation taken along the line 3—3 of FIG. 2, FIG. 4 is a side elevation showing details of a second embodiment of the invention, and FIG. 5 is a partial cross-sectional elevation taken along the line 5—5 of FIG. 4.

Briefly stated, the present invention provides attachments that may be affixed to bulldozers and similar tractive equipment to carry, dispense and implant flexible conduit. The entire system includes the use of a supply reel hoist attachment to be mounted on the dozer blade yoke of such equipment so that a supply reel of flexible conduit may be raised from an at-rest position on the ground to a carried position for subsequent travel along the desired implant path. The attachments further include an implant or mole attachment that is pivotally affixed and trailed behind a ripper tooth in such manner that the penetration depth for the ripper tooth and the attachment may be regulated by exercise of the power control unit of the tractor. Where implant depths are to be sufficient to prevent seasonal freezing of the conduit or its contents, the ripper tooth will be of considerable length, and likewise the implant attachment will be of corresponding size. For such installations a high order of tractive effort is required, and, accordingly, the use of one or more additional tractor units may be required.

Specific features of the invention are shown in the accompanying figures. In such figures the desired attachments are shown as applied to a bulldozer type of tractor 11. The carrying tractor 11 is itself connected to a lead track laying tractor 12 by use of a tow cable 15. The carrying tractor or dozer 11 is attached to a ripper 13 and pulls the ripper, inclusive of ripper tooth 14, along a desired path with the depth of penetration for the ripper being controlled by a cable system 16 that is powered by the power control unit 17 on the dozer 11.

When the equipment is being used for the placement of a flexible conduit 18, a mole or implant attachment 19 is pivotally affixed to the ripper tooth 14, and the conduit 18 is threaded through a guide tube 21 on the attachment 19. In order to provide a continuous supply of the conduit 18, a reel mount 22 is fixed to the front dozer blade yoke 23 of the dozer 11. Since the yoke 23 may be raised and lowered by a cable or hydraulic system on the dozer 11, the mount 22 can itself be raised and lowered. In the lowered position as illustrated in dotted outline in FIG. 1, the mount can receive a spindle 24 placed through the center of a conduit supply reel 26. Subsequent raising of the dozer yoke 23 will bring the reel 26 into the elevated position as shown so that the conduit 18 can be guided over the intermediate guide rollers 28 to be threaded through elements of the ripper attachment and to and through the guide tube 21.

Such overall arrangement makes it possible through exercise of this invention to implant various types of flexible conduit in underground positions. The types of conduit which have been successfully emplaced include underground power and communication lines as well as various types of hollow tubing that is used for fluid transmission. The system has been used successfully for the emplacement of plastic pipe water conduits in systems of extended length totalling more than 50 miles. The sizes of the cables and conduits emplaced have ranged up to 4 inches in diameter, and the depth of emplacement has been sufficient to provide a ground cover of at least 5 feet where water lines are being installed in order to prevent seasonal freezing. Hollow tube conduits may also be emplaced for the collection and transmission of fluid products inclusive of oil, natural gas and liquefied mineral products.

Since various types of flexible plastic pipe or conduit are now being manufactured that will withstand working pressures of up to 200 pounds per square inch, the full range of products and installations that may be carried and protected by such conduit is considerable. The further fact that the conduit can be emplaced at depths greater than the normal freeze line for soils through use of this invention materially expands the potential use of the system and equipment.

Prime advantages of the system include the capability to emplace conduit at a rate that considerably exceeds the emplacement rate for conventional trench digging apparatus. Such fast emplacement rate, in fact, makes the total cost of emplacement less than that normally experienced through use of conventional equipment. Such lowered emplacement cost has been noted even though it has in many instances been necessary to use one or more additional lead or pulling tractors in order to attain a sufficient draw-bar pull to implant the conduits.

Where conduits, such as water lines, are to be buried at a non-freezing level or where difficult soils are encountered, it has, on occasion, been necessary to prerip the ground ahead of actual implanting operations. For preripping activities it is desirable that the mode attachment 19 be readily removable from the ripper tooth 14. A quick means for attaching or detaching the mole is provided by the pivot system used and illustrated in the accompanying figures. As shown, the ripper tooth 14 is provided with a backwardly directed projection 27 that will be placed adjacent the top of the tooth 14, while a torus ring or lunette 28 is affixed to the lower end of the tooth 14. Projection 27 provides clevis type ends 29 having a hole disposed therethrough adapted for reception of a draw-bar pin 31. When in place, the pin 31 also passes through an angularly disposed opening (not shown) in an extension structure 32 of the mole attachment 19. The lower end of the mole 19 is provided with a pintle hook 33 which can be brought into engagement with the lunette 28. This assembly establishes a pivot axis about which the mole 19 will swing as it is pulled forwardly by the forces transmitted through the draw-bar pin 31 and pintle hook 33.

As illustrated, this pivot axis is disposed at a backwardly directed inclined angle, inasmuch as the lower point of attachment or pintle hook 33 leads the following and upper point of attachment provided by the draw-bar pin. In a successful embodiment of the invention, the angular disposition of this pivot axis is approximately 75 degrees to the horizontal. In the operation of the mechanism the rearwardly inclined pivot axis cooperates with the tapered lead edge 34 of increased inclination, the forces of gravtiy, and the resultant thrust forces exerted on the mole as it is being drawn through ripped earth structures to limit swinging movements of the mole 19. With this arrangement the ripper tooth 14 may be moved along curved paths, and the mole attachment will follow such ripper tooth without the mole being subjected to violent swinging movements. The mole will, accordingly, follow a regular curved path, and no violent bends will be induced into the conduit being implanted.

The rearwardly tapered surfaces 36 following the lead edge 34 on the mole 19 likewise cooperate with the angularly disposed lead edge and pivot axis to regulate the underground movement pattern for the mole 19. These surfaces, which are tapered in rearward and downward directions, help to keep the mole 19 in its lowered position behind the ripper tooth 14 in addition to giving greater effectiveness to the lead edge 34 in its attachment guiding functions. Any undesirable pivoting movements that might be caused by interference with buried rocks and the like are minimized by provision of the inclined pivot axis which requires elevation of the heavy mole against the forces of gravity and ground reactions to displace the mole sideways. In actual usage it has been found that this arrangement prevents breakage of conduits being emplaced by reason of erratic movements of the mole. Further, it has been found that the mole can be moved behind the ripper along a curved path without breakage of such conduits. This beneficial result is obtained in the present embodiment of the invention through provision of a pivot axis inclined at an angle of approximately 75 degrees, while the lead edge 34 is inclined at an angle of approximately 60 degrees.

This combination has given a good result where conduits of up to 4-inch diameter are being emplaced by a D–9 Cat being pulled by a D–8 Cat. For the placement of such lines it is obvious that the equipment used is quite massive. A mole of the configuration shown and used for the purposes described can weigh in excess of one ton, and, accordingly, the quick attachment features of this embodiment are of considerable importance. This is specially true where the same tractors may be used both for preripping and implant operations. On the job the detached mole 19 can be carried on a separate trailer structure which holds the implement in its vertical position. With this arrangement the ripper tooth can be elevated out of the earth through use of cable system 16 and the power control unit. After the mole is attached by engagement of the pintle hook 33 and the draw-bar pin 31, the entire unit can again be lowered into the ground as it is moved forwardly by reverse action of the cables and through application of the excess weight of the counterweight 37 of the ripper 13.

While communication cables of a type that might be supplied on a reel 26 are quite flexible and can, accordingly, be bent about relatively short radiuses, it is desirable that the same mole unit be usable for various types of flexible conduit. The new types of plastic pipe are themselves quite flexible, but it has been found that it is desirable to limit all bends for 4-inch pipe to a radius of approximately six feet. Accordingly, the radius R of the guide tube 21 adjacent the outlet end thereof is maintained at the six-foot figure for the embodiment illustrated.

The upper end of the guide tube 21 can likewise be provided with an introduction radius if desired. Preferably, the radius at the inlet, however, should be positioned so that the conduits to be emplaced can be threaded along an elevated path as illustrated in FIGURE 1 or, alternately, so that the conduit that is to be emplaced can be picked up off the ground from between the tracks of the tractor 11 as the machinery is moved along its desired implant path. Where flexible plastic tubing of larger sizes is being used, the ground pick-up is preferred, since the tube does not then have to be brought over the top of the tractor where it might interfere with the operator's maneuvers. Such pipe is ordinarily sold in cut lengths of 20, 40 and 60 feet, and it can be readily fabricated into a continuous tube at the job site. In operation, the pipe is disposed along the desired path, and the joints are then cemented ahead of the time when the pipe will actually be implanted. During preripping and similar operations, the pipe can be kept out of the way to prevent damage thereto until it is desired to place the conduit through operation of the units as described.

This simplified type of placement operations and the relatively lower cost for plastic conduit make it possible through use of the present system to complete water and other fluid collection and distribution systems at a cost lower than that heretofore possible. The full economies mentioned, in fact, make it possible to install permanently emplaced irrigation systems for the sprinkling irrigation of large areas at total costs that are comparable with present exposed pipe type of installations.

A separate embodiment of the invention is shown in FIGURES 4 and 5. The modified type of equipment shown in these figures has been found to have additional advantages when types of conduit or cable that are more susceptible to damage are being used. The main distinction between this embodiment of the invention and that previously described is in the changed top mount and support for the mole 19. In this unit the projections 27 and draw bar pin 31 are not used. As a substitute for these elements the inventor provides a projecting guide box 47 which extends rearwardly behind the ripper tooth 14 and is connected to the ripper and counterweight construction 13–37. The guide box 47 provides rearwardly extending side guide pieces 48 and 49 which can be engaged by a pivot bar 51 disposed on extension 32 of the mole 19. The pivot bar 51 is then free to move reciprocally between the side pieces 48 and 49 and within the guide box 47.

Since the pivot bar 51 is free to move between the respective guides, the mole itself has a tendency to follow the lower point of attachment provided by the pintle hook 33 and lunette 28. This freedom to move fore and aft at the top of the mole eliminates most of the violent direction changes that would otherwise occur at the rear end of the tube 21 when the tractive equipment moves over sharp rises or through depressions encountered along the pipeline right of way.

With previous two-point attachments for moles the rear end of the mole was subjected to an accented movement pattern which could cause breakage of many types of flexible conduit that could otherwise be handled with this equipment. Where the top of the mold attachment is free to move in the fore and aft direction the rear end of the mole will not be subjected to such an accented movement pattern, and conduits being emplaced will not be broken or damaged.

While a rear limiting end 53 is shown in FIGURE 5 to close off the guide box 47, such end may be eliminated or may be removably attached where even greater freedom is desired. With the rear ends of the guide open, engagement of the mole to the ripper tooth towing unit is greatly facilitated.

While separate embodiments of the invention have been shown, it will be obvious that the invention is adaptable to various modifications and changes. All such modifications are considered to be a part of this invention.

I claim:

1. A flexible conduit emplacing attachment for use with tractor type equipment to place conduit beneath earth surfaces comprising a frame, a downwardly depending ripper tooth on said frame to which the towing forces of said equipment are transmitted, means for adjusting the earth penetrating depth of said tooth, a separate mole implant unit for use behind said ripper tooth of operative height corresponding to the height of said tooth whereby a portion of such mole unit is adjacent or above the earth surface for all selected penetration depths of said ripper tooth and mole, means disposed at a rearwardly inclined angle for selectively and pivotally connecting said mole unit to said frame and ripper tooth establishing an inclined pivot axis for said mole unit whereby the forces tending to move said tooth will be transmitted to said mole unit, a leading edge on said mole unit disposed at a rearwardly inclined angle greater than the angle of inclination away from the vertical for said mole connecting means, and conduit guide means on said mole unit adapted to receive flexible conduit from positions above the earth surface and direct said conduit along a path to the bottom of said mole unit whereby said conduit is deposited and emplaced at the bottom of a furrow dug by the ripper tooth and mole unit of said attachment, said rearwardly inclined pivot axis and leading edge for said mole unit being coactive with the weight and length of said mole unit to limit abrupt swinging movements of said mole that might damage said flexible conduit.

2. A flexible conduit emplacing attachment for use with tractor type equipment to place conduit beneath earth surfaces comprising a frame, a downwardly depending ripper tooth on said frame to which the towing forces of said equipment are transmitted, means for adjusting the earth penetrating depth of said tooth, a separate mole implant unit for use behind said ripper tooth of operative height corresponding to the height of said tooth whereby a portion of such mole unit is adjacent or above the earth surface for all selected penetration depths of said ripper tooth and mole, means disposed at a rearwardly inclined angle for selectively and pivotally connecting said mole unit to said frame and ripper tooth establishing an inclined pivot axis for said mole unit whereby the forces tending to move said tooth will be transmitted to said mole unit, a leading edge on said mole unit disposed at a rearwardly inclined angle greater than the angle of inclination away from the vertical for said mole connecting means, rearwardly and downwardly tapering surfaces on said mole unit away from said leading edge, said rearwardly inclined pivot axis for said mole unit being coactive with the weight and length of said mole to limit abrupt swinging movements of said mole and said rearwardly inclined leading edge and rearwardly and downwardly tapering surfaces being active with the earth impinged thereagainst to hold said mole unit at the desired penetration depth and to improve the tooth following characteristics of said mole, and conduit guide means on said mole unit adapted to receive flexible conduit from positions above the earth surface and direct said conduit along a path to the bottom of said mole unit whereby said conduit is deposited and emplaced at the bottom of a furrow dug by the ripper tooth and mole unit of said attachment.

3. A flexible conduit emplacing attachment for use with tractor type equipment to place conduit beneath earth surfaces comprising a frame, a downwardly depending ripper tooth on said frame to which the towing forces of said equipment are transmitted, means for adjusting the earth penetrating depth of said tooth, a separate mole implant unit for use behind said ripper tooth of height corresponding to the operative height of said tooth whereby a portion of such mole unit is adjacent or above the earth surface for all selected penetration depths of said ripper tooth and mole, a rearwardly inclined leading edge on said mole unit, means at the lower extremity of said ripper tooth for pivotally and selectively connecting said mole unit to said ripper tooth for rotation with respect to horizontal and vertical axes of reference whereby the forces tending to move said tooth through the earth will be transmitted to the bottom of said mole unit, a guide piece adjacent the upper end of said ripper tooth and extending rearwardly therefrom for engagement with said mole unit to hold said mole unit in near vertical orientation while permitting fore and aft movement of the upper end of said mole unit as the unit moves rotationally with respect to the lower horizontal axis of reference, said guide piece further permitting free swinging movements of the rear end of said mole unit as the unit rotates about the resultant movable vertical axis, and conduit guide means on said mole unit adapted to receive flexible conduit from positions above the earth surface and direct said conduit along a path to the bottom of said mole unit whereby said conduit is deposited and emplaced at the bottom of a furrow dug by the ripper tooth and mole unit of said attachment.

4. A flexible conduit emplacing attachment for use with tractor type equipment to place conduit beneath earth surfaces comprising a frame, a downwardly depending ripper tooth on said frame to which the towing forces of said equipment are transmitted, means for adjusting the earth penetrating depth of said tooth, a separate mole implant unit for use behind said ripper tooth of height corresponding to the operative height of said tooth whereby a portion of such mole unit is adjacent or above the earth surface for all selected penetration depths of said ripper tooth and mole, a rearwardly inclined leading edge on said mole unit, means at the lower extremity of said ripper tooth for pivotally and selectively connecting said mole unit to said ripper tooth for rotation with respect to horizontal and vertical axes of reference whereby the forces tending to move said tooth through the earth will be transmitted to the bottom of said mole unit, a guide piece adjacent the upper end of said ripper tooth and extending rearwardly therefrom for engagement with said mole unit to hold said mole unit in near vertical orientation while permitting fore and aft movement of the upper end of said mole unit as the unit moves rotationally with respect to the lower horizontal axis of reference, said guide piece being cooperatively positioned with respect to said lower connecting means to establish a rearwardly inclined and movable axis for swinging movements of said mole unit with respect to said vertical axis of reference when said mole unit is in position of use, and conduit guide means on said mole unit adapted to receive flexible conduit from positions above the earth surface and direct said conduit along a path to the bottom of said mole unit whereby said conduit is deposited and emplaced at the bottom of a furrow dug by the ripper tooth and mole unit of said attachment.

5. Structure as set forth in claim 3 wherein said guide piece comprises a pair of elements rigidly extending rearwardly with respect to said ripper tooth on opposite sides of the mole unit.

6. Structure as set forth in claim 4 wherein said guide piece comprises a pair of elements rigidly extending rearwardly with respect to said ripper tooth on opposite sides of the mole unit.

7. Structure as set forth in claim 4 and further comprising a leading edge on said mole unit disposed at a rearwardly inclined angle whereby said rearwardly inclined pivot axis and leading edge for said mole unit are coactive with the weight and length of said mole unit to limit abrupt swinging movements of said mole.

8. Structure as set forth in claim 7 and further comprising rearwardly and downwardly tapering surfaces on said mole unit away from said leading edge whereby said tapering surfaces are further active with the earth impinged thereagainst to hold said mole unit at a desired penetration depth and to improve the tooth following characteristics of said mole.

9. Structure as set forth in claim 3 wherein said guide piece comprises a box-like member having elements rigidly extending rearwardly with respect to said ripper tooth on opposite sides of the mole unit, and an end piece for engaging said elements operative as a stop to limit the fore and aft movement of the upper end of said mole when said ripper tooth and mole unit is to be raised with respect to the earth surface.

References Cited

UNITED STATES PATENTS

| | | | |
|---|---|---|---|
| 316,515 | 4/1885 | Anderson | 61—72.5 |
| 338,678 | 3/1886 | Sullivant. | |
| 628,039 | 7/1899 | Rood et al. | 61—72.6 |
| 1,737,314 | 11/1929 | Kirby | 61—72.6 |
| 1,817,792 | 8/1931 | Yares. | |
| 2,155,044 | 4/1939 | Gray. | |
| 2,184,912 | 12/1939 | Freeman. | |
| 2,647,758 | 8/1953 | Ryan. | |
| 2,663,515 | 12/1953 | Kinsinger | 61—72.6 X |
| 2,812,731 | 11/1957 | Gardner. | |
| 2,900,931 | 8/1959 | Lisle. | |
| 3,170,300 | 2/1965 | Kelley | 61—72.6 |
| 3,170,301 | 2/1965 | Kelley | 61—72.6 |

ERNEST R. PURSER, *Primary Examiner.*